(12) United States Patent
Reial et al.

(10) Patent No.: US 7,711,033 B2
(45) Date of Patent: May 4, 2010

(54) SIR PREDICTION METHOD AND APPARATUS

(75) Inventors: Andres Reial, Lund (SE); Douglas A. Cairns, Durham, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1016 days.

(21) Appl. No.: 11/105,797

(22) Filed: Apr. 14, 2005

(65) Prior Publication Data

US 2006/0233222 A1    Oct. 19, 2006

(51) Int. Cl.
*H04B 1/00* (2006.01)

(52) U.S. Cl. .................... 375/147; 375/146; 375/340; 375/346; 455/296; 455/522; 370/335; 370/342

(58) Field of Classification Search ............. 375/147, 375/148, 316, 346; 455/522
See application file for complete search history.

(56) References Cited

U.S. PATENT DOCUMENTS

| | | | |
|---|---|---|---|
| 5,305,468 A | 4/1994 | Bruckert et al. | |
| 5,991,273 A | 11/1999 | Abu-Dayya | |
| 6,292,519 B1 | 9/2001 | Popovic | |
| 6,404,826 B1 | 6/2002 | Schmidl et al. | |
| 6,426,971 B1 | 7/2002 | Wu et al. | |
| 6,519,705 B1* | 2/2003 | Leung | 713/300 |
| 6,609,008 B1 | 8/2003 | Whang et al. | |
| 6,751,199 B1 | 6/2004 | Sindhushayana et al. | |
| 6,804,312 B1 | 10/2004 | Win et al. | |
| 6,816,717 B1 | 11/2004 | Sipila | |
| 6,834,197 B2 | 12/2004 | Nakahara et al. | |
| 7,058,028 B1* | 6/2006 | Holma et al. | 370/318 |
| 2001/0019961 A1* | 9/2001 | Nakahara et al. | 455/522 |
| 2002/0021682 A1 | 2/2002 | Ariyoshi et al. | |
| 2002/0115459 A1* | 8/2002 | Chuang et al. | 455/522 |
| 2002/0186761 A1* | 12/2002 | Corbaton et al. | 375/231 |
| 2003/0012261 A1 | 1/2003 | Toda | |
| 2003/0016740 A1 | 1/2003 | Jeske et al. | |
| 2003/0202568 A1 | 10/2003 | Choi et al. | |
| 2003/0223489 A1* | 12/2003 | Smee et al. | 375/233 |
| 2004/0013190 A1* | 1/2004 | Jayaraman et al. | 375/233 |

(Continued)

FOREIGN PATENT DOCUMENTS

EP    1130797 A2    11/2000

(Continued)

OTHER PUBLICATIONS

Bottomley et al, "DS-CDMA SIR Estimation with Bias Removal", IEEE Mar. 2005.*

(Continued)

*Primary Examiner*—David C Payne
*Assistant Examiner*—Leon Flores
(74) *Attorney, Agent, or Firm*—Coats & Bennett, PLLC

(57) ABSTRACT

The present invention provides a method and apparatus for generating SIR estimates early in a time interval that include the benefits of interference suppression without requiring the computation of specific interference suppression elements. In particular, the present invention generates an SIR estimate for a RAKE receiver during a current time interval based on channel estimates generated based on the received signal(s). By applying an offset derived during a previous time interval to the RAKE SIR estimate, the present invention generates a second SIR estimate for a G-RAKE receiver.

26 Claims, 4 Drawing Sheets

U.S. PATENT DOCUMENTS

| | | |
|---|---|---|
| 2004/0038658 A1 | 2/2004 | Gurelli et al. |
| 2004/0038699 A1* | 2/2004 | Toono .................... 455/522 |
| 2004/0093178 A1 | 5/2004 | Shin et al. |
| 2004/0142698 A1 | 7/2004 | Pietraski |
| 2004/0203462 A1 | 10/2004 | Lin et al. |
| 2004/0247059 A1 | 12/2004 | Seto et al. |
| 2005/0075077 A1* | 4/2005 | Mach et al. .............. 455/67.13 |

FOREIGN PATENT DOCUMENTS

| | | |
|---|---|---|
| EP | 1313243 A1 | 5/2001 |
| GB | 2373135 A | 9/2002 |
| GB | 2401004 A | 10/2004 |
| WO | WO 01/65717 A1 | 2/2001 |
| WO | WO 2004/036782 A1 | 4/2004 |
| WO | WO 2004/051902 A1 | 6/2004 |

OTHER PUBLICATIONS

Bottomley, G., Ottoson, T., Wang, Y-P, "A generalized RAKE receiver for interference suppression," IEEE JSAC, vol. 18, No. 8, Aug. 2000, pp. 1536-1545.

Holma, H., Toskala, A., WCDMA for UMTS, Wiley 2000, 7 pages.

Jonsson, E., "A Method and Apparatus for Received Signal Quality Estimation," U.S. Appl. No. 10/799,322, filed Mar. 12, 2004.

* cited by examiner

SIR PREDICTION METHOD AND APPARATUS

BACKGROUND OF THE INVENTION

The present invention generally relates to wireless receivers, and more particularly to estimating a signal quality metric, i.e., a signal-to-interference ratio (SIR), in a wireless receiver.

Receivers in wireless networks typically estimate one or more signal quality metrics to process the received data, to evaluate channel conditions, and/or to generate control signals related to current channel conditions. One signal quality metric of particular interest to wireless receivers is the signal-to-interference ratio (SIR) associated with the received signals. Conventional receivers typically calculate the SIR of received signals and use the calculated SIR, for example, to generate a power control command or a channel quality indication (CQI). For example, a mobile station may transmit a power control command determined based on an estimated SIR to the base station to control the transmit power of the base station on a downlink communication channel. Similarly, a mobile station may provide the base station with a channel quality indication (CQI) based on the estimated SIR. The base station may use the CQI for link adaptation and rate control.

The accuracy of the channel feedback depends on the accuracy of the SIR estimates. In turn, the accuracy of the SIR estimates depends on the amount of time available to perform the calculation, the complexity of the receiver architecture, and/or existing architecture constraints.

BRIEF SUMMARY OF THE INVENTION

The present invention comprises a receiver circuit and a signal quality metric estimation method for generating multiple estimates of a signal quality metric, where each estimate may be used for different operations associated with the receiver. Because the different estimates are available at different times, one estimate generated early in a time interval may be used to accurately provide channel feedback to the base station, such as power control commands, CQI, etc., while a later generated estimate may be used to process the received signal.

In particular, the present invention determines a first estimate of the signal quality metric for a first receiver type based on the received signals. Applying an offset to the first estimate generates a second estimate of the signal quality metric for a second receiver type. According to one exemplary embodiment, the first estimate is determined during a current time interval, while the offset used to generate the second estimate is computed during a previous time interval. Further, the present invention determines a final estimate of the signal quality metric for the second receiver type based on the received signals during the current time interval. Based on this final estimate, the receiver generates the offset for a subsequent time interval. As a result, during each time interval associated with the received signals, a signal quality metric estimator may modify a first estimate using an offset determined in a previous time interval to generate a second estimate, and generate an offset for a subsequent time interval based on the final estimate.

Because the second estimate is available before the final estimate, and because the second estimate represents an approximation of the final estimate, the second estimate may be used to accurately provide desired channel feedback to the base station without incurring the time delay normally associated with the final estimate. As such, while the final estimate may be used to process the received signals, the second estimate may be used to provide channel feedback in a timely manner.

DETAILED DESCRIPTION OF THE INVENTION

Figure 1:
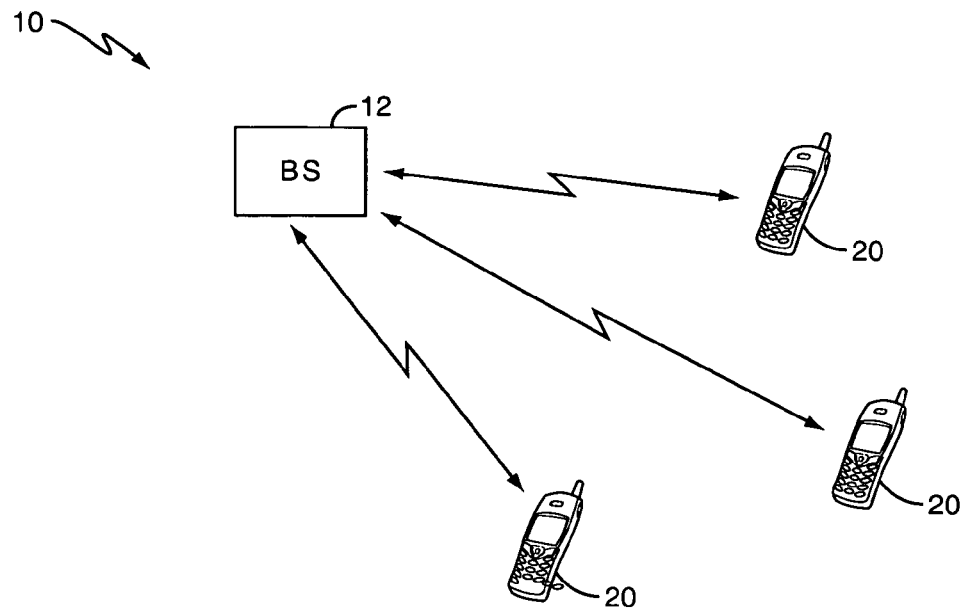
FIG. 1 illustrates a block diagram for an exemplary wireless network.

FIG. 1 illustrates an exemplary wireless communication network 10. As discussed further herein, wireless communication network 10 may comprise a spread spectrum wireless communication network. However, as will be appreciated by those skilled in the art, the present invention is also applicable to other types of wireless communication networks.

Network 10 includes at least one base station 12 and at least one mobile station 20. As used herein, the term "mobile station" may include a cellular radiotelephone with or without a multi-line display; a Personal Communications System (PCS) terminal that may combine a cellular radiotelephone with data processing, facsimile and data communications capabilities; a personal data assistant (PDA) that can include a radiotelephone, pager, Internet/intranet access, Web browser, organizer, calendar, and/or a global positioning system (GPS) receiver; and a conventional laptop and/or palmtop receiver or other appliance that includes a radiotelephone transceiver. Mobile stations may also be referred to as "pervasive computing" devices.

Base station 12 transmits signals with one or more symbols on one or more downlink channels to mobile station 20. The transmitted signals typically include traffic and pilot signals. Mobile station 20 may receive the transmitted signals directly, or may receive delayed versions of the transmitted signals due to interference from one or more interfering objects (not shown). Mobile station 20 processes the received signals to reconstruct the transmitted information. In addition, base station 12 may receive signals transmitted on one or more uplink channels by the mobile station 20. These uplink channel signals may comprise traffic signals, channel feedback, i.e., power control commands, channel quality indication, etc.

Figure 2:
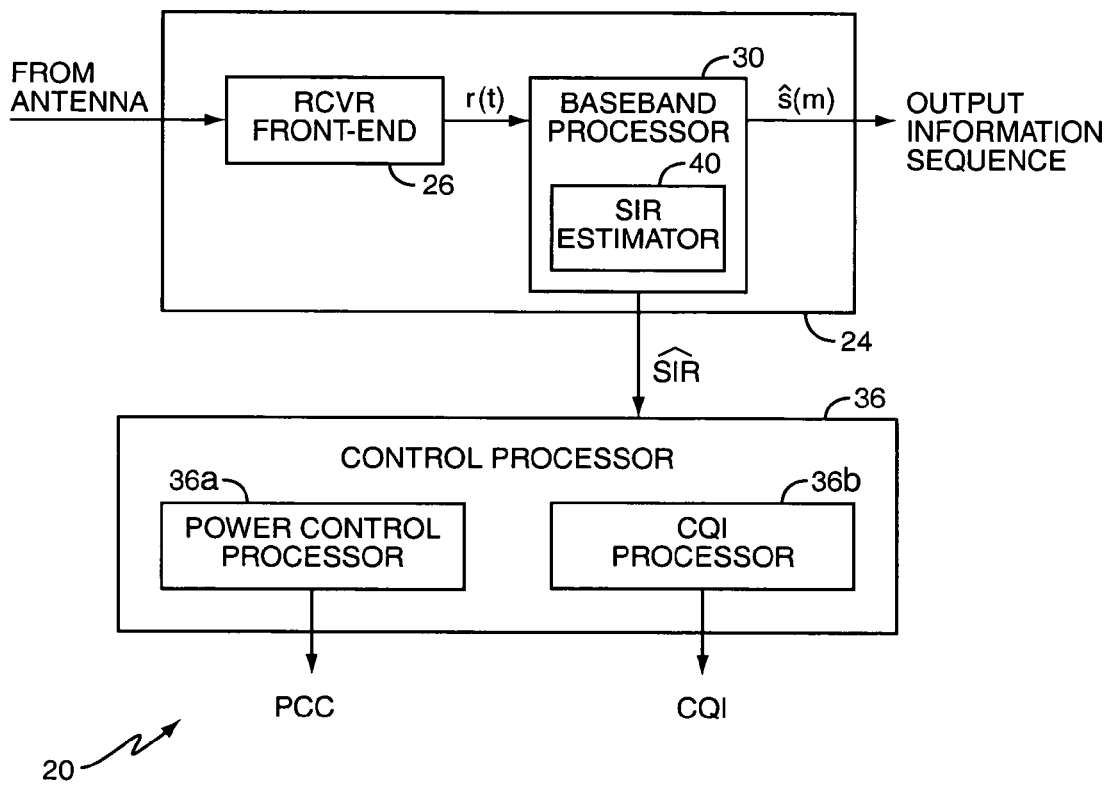
FIG. 2 illustrates a block diagram for receiver circuits in an exemplary mobile station operating in the wireless network of FIG. 1.

FIG. 2 illustrates receiver circuits for an exemplary mobile station 20 in more detail. As shown in FIG. 2, the receiver circuits in mobile station 20 include a receiver 24 and a control processor 36. Receiver 24 receives and processes received signals to generate received symbol estimates. An exemplary receiver 24 includes a receiver front end 26 and a baseband processor 30. Receiver front end 26 typically includes filters, mixers, and/or conversion circuits, such as analog-to-digital converters, to produce a series of digitized baseband signal samples r(t) corresponding to the received signal. Baseband processor 30 demodulates and decodes the baseband signal r(t) and outputs an estimate of the original transmitted information sequence.

Baseband processor 30 includes a conventional signal quality metric estimator, such as SIR estimator 40, that estimates a signal quality metric, such as an SIR, based on the received signals. As well understood, baseband processor may use an SIR estimate to process the received signals. In addition, baseband processor 30 may provide an SIR estimate to control processor 36 to generate one or more control parameters using one or more channel feedback processors. For example, control processor 36 may include a power control processor 36a and a CQI processor 36b to generate a power control command and/or a CQI signal, respectively, based on the estimated SIR.

Figure 3:
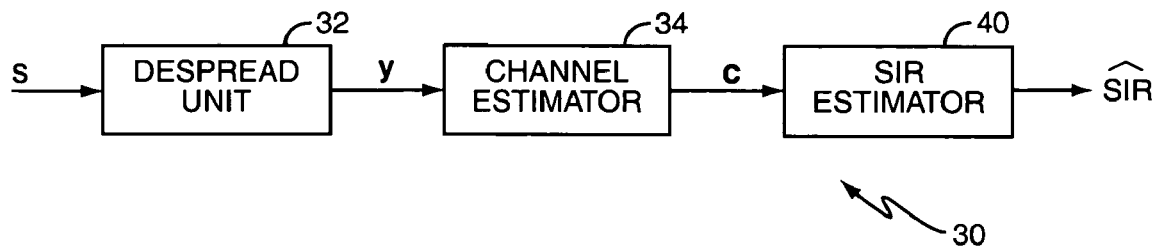
FIG. 3 illustrates a block diagram for an exemplary baseband processor of the receiver circuit of FIG. 2.

As discussed above, accurate SIR estimates play an important role in wireless communications. Therefore, to facilitate understanding of the present invention, the following briefly describes a conventional procedure for calculating the SIR for a conventional despread and combine type receiver, such as a RAKE receiver or a G-RAKE receiver. In this type of receiver, baseband processor 30 may further include a despread unit 32 and a channel estimator 34 operatively connected to SIR estimator 40, as shown in FIG. 3. Despread unit 32 despreads the received signal to generate a vector of despread symbols or values y according to:

$$y = hs + u \qquad (1)$$

where s represents the received symbol, h represents the composite channel associated with the wireless system, including the transmit and receive filters, and u represents an interference vector that includes thermal noise, inter-symbol interference, and multiple access interference.

Based on the despread symbols y, channel estimator 34 generates a vector of channel estimates c according to any means known in the art. For example, the channel estimate vector c may be derived according to:

$$c = \left(\frac{1}{K}\right) \sum_{i=1}^{K} b^*(i) y(i) \qquad (2)$$

where K represents the number of pilot symbols processed by the receiver 24, b(i) represents a known pilot symbol for the $i^{th}$ symbol period, b*(i) represents the complex conjugate of b(i), and y(i) represents the vector of despread symbols or values from different path delays for the $i^{th}$ symbol period.

Based on the channel estimates c, SIR estimator 40 computes the combining weights w according to any known means. For a RAKE receiver, the combining weights are simply equivalent to c, as shown in Equation (3).

$$w = c \qquad (3)$$

However, for a G-RAKE receiver, the combining weights may be computed according to:

$$w = R^{-1} c, \qquad (4)$$

where R represents the impairments covariance matrix for the G-RAKE fingers. The impairments covariance R represents the noise plus interference statistics of u, such as $2^{nd}$ order statistics or correlations between impairments on receiver fingers. Because those skilled in the art will appreciate that "covariance" is a special case of "cross-correlation" with zero mean, the terms "correlation" and "covariance," as used herein, should be understood as interchangeable unless the context of a particular passage makes an explicit distinction between the two terms.

Once the combining weights w and impairments covariance matrix R are computed, a conventional SIR estimator 40 may compute the SIR according to:

$$SIR = \frac{|w^H c|^2}{w^H R w}. \qquad (5)$$

By computing the SIR using the combining weights w and the impairments covariance matrix R, the calculated SIR accounts for the interference suppression provided by a G-RAKE receiver.

As shown in Equation (5), in order to take advantage of the interference suppression provided by G-RAKE receivers in a current time slot or interval, the combining weights w and impairments covariance matrix R must be calculated before the SIR can be calculated. However, the combining weights and/or the impairments covariance may not be available when the SIR is estimated. As such, conventional SIR estimators typically cannot provide SIR estimates that include the interference suppression typically associated with a G-RAKE receiver.

To illustrate this, consider the following conventional G-RAKE process sequence for a given time interval.

1. Determine channel estimates c for the active (combined) fingers.
2. Generate the SIR estimate for the active fingers.
3. Generate the power control command based on the estimated SIR from step 2.
4. Compute the combining weights w and the impairments covariance R for the active fingers.
5. etc.

As shown by the above process sequence, a conventional G-RAKE receiver estimates the SIR in step 2 so that the power control command may be generated and delivered to the base station in a timely manner. However, the combining weights w and the impairments covariance R are not available until after the completion of step 4. As such, the SIR used to generate a power control command does not take into account the interference suppression provided by a conventional G-RAKE.

Alternatively, a receiver may encapsulate operations into processing elements that communicate by passing messages. For example, operations related to control or pilot channels (channel estimation, CQI estimation, ACK/NACK signaling) may be grouped into one processing element, while operations related to G-Rake computations may be grouped into another processing element and traffic channel operations into a third processing element, etc. In such a functional split, the G-Rake processing element requires information from the control/pilot processing element, such as pilot despread values and channel estimates, in order to calculate the combining weights w and/or impairments covariance matrix R. Because the G-Rake processing element depends on the output of the control/pilot processing element, the CQI reported by the control/pilot processing element will not reflect the current G-Rake combining weights. Thus, the reported CQI will be inaccurate.

The problems illustrated by the above examples may be addressed by modifying the software architecture to delay the SIR estimation until after the combining weights w and/or the impairments covariance matrix R are computed. However, such modifications may degrade the receiver performance in fast fading environments, and/or be undesirable for other practical reasons.

Further, even if the combining weights w and/or the impairments covariance R were available for generating the SIR estimate, the calculation associated with Equation (5) is non-trivial for some receivers, and therefore, may take an undesirable amount of time to compute. To address this problem, conventional receivers may approximate the SIR according to Equation (6):

$$SIR \approx \sum_f \frac{|c_f|^2}{I_f}, \quad (6)$$

where $I_f$ represents the impairment signal variance for finger f. Equation (6) provides an accurate SIR estimation for a traditional RAKE receiver if the impairment signals of the different RAKE fingers are uncorrelated. However, if weights other than RAKE weights, such as G-RAKE weights, are used during the combining phase of the RAKE receiver, and/or if the impairment signals of the different fingers are correlated, causing the impairments covariance matrix R to have significant off-diagonal elements, the SIR estimate computed from Equation (6) will be highly inaccurate.

To reduce the errors in the SIR estimate due to the finger correlation, a weighting factor $c_f$ may be added to each summed term of Equation (6) to reduce the effect of the strongly correlated fingers. However, this type of correction still does not address the errors caused by using the incorrect combining weights.

To address the above-identified problems, the present invention generates a first estimate of the SIR for a RAKE receiver, and applies an offset to the RAKE SIR estimate to generate a second estimate of the SIR for a G-RAKE receiver. Because the second estimate simply approximates the conventional G-RAKE SIR, the present invention can generate the second estimate based on the channel estimates c generated during the current time interval without relying on the G-RAKE combining weights w and/or impairments covariance matrix R typically required to generate a G-RAKE SIR estimate.

While the following discussions focus on estimating a signal quality metric as it relates to RAKE and G-RAKE receivers, those skilled in the art will appreciate that the present invention also applies to any signal quality metric estimation process that offsets a first estimate of the signal quality metric for a first receiver type to generate a second estimate of the signal quality metric for a second receiver type. The present invention also applies to chip equalization receivers, decision feedback equalization receivers, etc.

Figure 4:
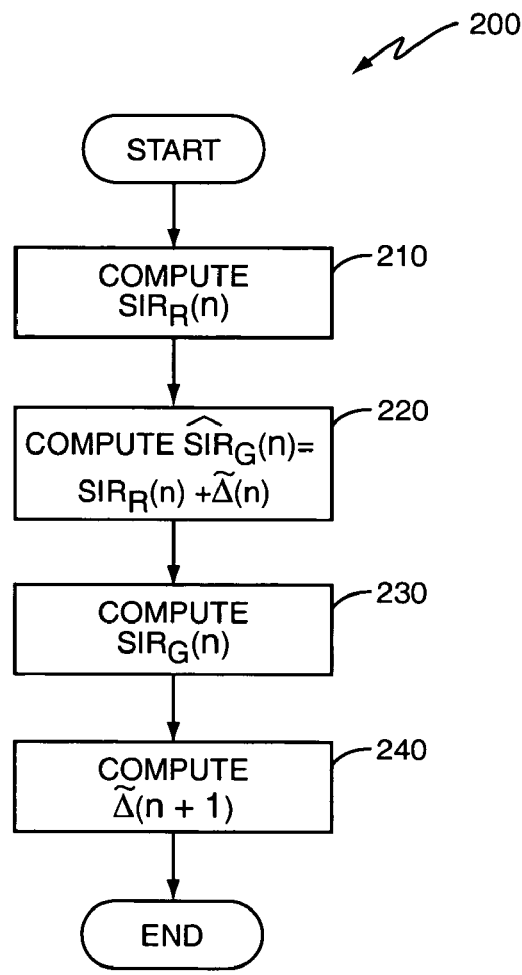
FIG. 4 illustrates an exemplary process for generating the SIR estimates according to the present invention.

FIG. 4 illustrates one exemplary method 200 for estimating an SIR according to the present invention. As shown in FIG. 4, SIR estimator 40 computes $SIR_R(n)$, which represents a first estimate of the SIR for a RAKE receiver (block 210). Based on an SIR offset, $\tilde{\Delta}(n)$, SIR estimator 40 generates $\hat{SIR}_G(n)$, which represents a second SIR estimate for a G-RAKE receiver (block 220), according to:

$$\hat{SIR}_G(n) = SIR_R(n) + \tilde{\Delta}(n). \quad (7)$$

As discussed further below, SIR estimator 40 computes $SIR_R(n)$ during the current time interval, whereas SIR estimator 40 computes $\tilde{\Delta}(n)$ for the current time interval during a previous time interval. In addition, as illustrated in FIG. 4, SIR estimator 40 may perform additional computations during the current time interval to generate the offset for a subsequent time interval $\tilde{\Delta}(n+1)$. In particular, SIR estimator 40 computes $SIR_G(N)$ (block 230), which represents a final estimate of the SIR for the G-RAKE receiver, during the current time interval according to any conventional means. For example, $SIR_G(n)$ may be computed according to Equation (5). Based on $SIR_G(n)$, SIR estimator 40 computes the SIR offset for a subsequent time interval, $\tilde{\Delta}(n+1)$ (block 240), as discussed further below. According to the present invention, SIR estimator 40 predicts the SIR offset for a subsequent time interval $\tilde{\Delta}(n+1)$ based on a final SIR, $SIR_G(n)$, for the G-RAKE receiver computed according to conventional means during the current time interval.

In one exemplary embodiment, a smoothing filter may be used to compute the SIR offset for a subsequent time interval, $\tilde{\Delta}(n+1)$. In this embodiment, SIR estimator 40 computes an SIR error, $\Delta_{inst}$, based on a difference between the RAKE SIR and the final G-RAKE SIR as shown in Equation (8).

$$\Delta_e(n) = SIR_G(n) - SIR_R(n) \quad (8)$$

By applying a smoothing filter to the current offset and to the SIR error, as shown in Equation (9), SIR estimator 40 computes the SIR offset for a subsequent time interval, $\tilde{\Delta}(n+1)$.

$$\tilde{\Delta}(n+1) = \lambda \tilde{\Delta}(n) + (1-\lambda) \Delta_e(n) \quad (9)$$

In Equation (9), $\lambda$ represents a smoothing parameter having a value between 0 and 1 that may be chosen based on the channel variation rate. For example, a small $\lambda$ may be used when channel conditions are rapidly changing, such as when the mobile station is in a moving vehicle. Alternatively, a large $\lambda$ may be used when channel conditions experience little to no change, such as when the mobile station is moving slowly or when the mobile station is stationary. According to one exemplary embodiment, the SIR offset for the first time interval, $\tilde{\Delta}(n=0)$, may be initialized to zero. While the resulting second SIR estimate for the first time interval will reflect the SIR of a RAKE receiver rather than a G-RAKE receiver, this short term discrepancy does not effect the overall steady state performance of the receiver 24.

According to another exemplary embodiment of the present invention, SIR estimator 40 may use an adaptive filter to generate the SIR offset for the subsequent time interval $\tilde{\Delta}(n+1)$. In this exemplary embodiment, the SIR error, $\Delta_e(n)$, is generated according to Equation (8). After determining the DC components $\Delta_{DC}$ present in the SIR error using Equation (10)

$$\Delta_{DC}(n) = \alpha \Delta_{DC}(n-1) + (1-\alpha) \Delta_e(n), \quad (10)$$

where $\alpha$ represents a constant between 0.99 and 1.0, a DC compensated SIR error $\Delta_e'(n)$ is generated according to Equation (11).

$$\Delta_e'(n) = \Delta_e(n) - \Delta_{DC}(n) \quad (11)$$

For DC removal computations in the first time interval (n=0), $\Delta_{DC}(-1)$ may be initialized to 0.

In the exemplary filter embodiment, the SIR offset for a subsequent time interval $\tilde{\Delta}(n+1)$ may be computed according to Equation (12):

$$\tilde{\Delta}(n+1) = a^T(n)\Gamma(n) + \Delta_{DC}(n). \quad (12)$$

In Equation (12), a represents an adaptive filter, such as a linear prediction filter, comprising a vector of filter coefficients $a_1$, $a_2$, etc., and $\Gamma(n)$ represents a vector of DC compensated SIR errors $\Delta_e'$ from the current time interval and two previous time intervals as shown in Equations (13) and (14), respectively.

$$a(n)=[a_1(n), a_2(n), a_3(n)]^T \tag{13}$$

$$\Gamma(n)=[\Delta_e'(n), \Delta_e'(n-1), \Delta_e'(n-2)]^T \tag{14}$$

After the SIR offset is computed for a subsequent time interval $\tilde{\Delta}(n+1)$, SIR estimator 40 adapts characteristics, e.g., filter coefficients, of the linear prediction filter to generate the filter coefficients of the linear prediction filter for the subsequent time interval, $a(n+1)$. In one exemplary embodiment, the coefficients may be adapted according to:

$$e(n) = \Delta_e'(n) + \Delta_{DC}(n) - \tilde{\Delta}(n) \tag{15}$$

$$a(n+1) = a(n) + \frac{\mu}{|\Gamma(n)|^2 + \delta} e(n)\Gamma(n),$$

where $\mu$ represents a small positive constant that controls the adaptation speed and $\delta$ represents a positive constant that ensures the stability of the division operation by preventing the denominator of $a(n+1)$ from ever being zero. For the first time interval, the linear prediction filter may be initialized to $a(0)=[0, 0, 0]^T$.

While the above illustrates computing the SIR offset $\tilde{\Delta}$ based on the current and two previous DC compensated SIR error values, those skilled in the art will appreciate that the present invention is not so limited. Any number of previous values may be used based on the desired accuracy and complexity of the SIR estimator 40 and/or receiver 24. Further, while the above describes the invention in terms of a linear prediction filter, those skilled in the art will appreciate that other adaptive filters may be used.

Figure 5:
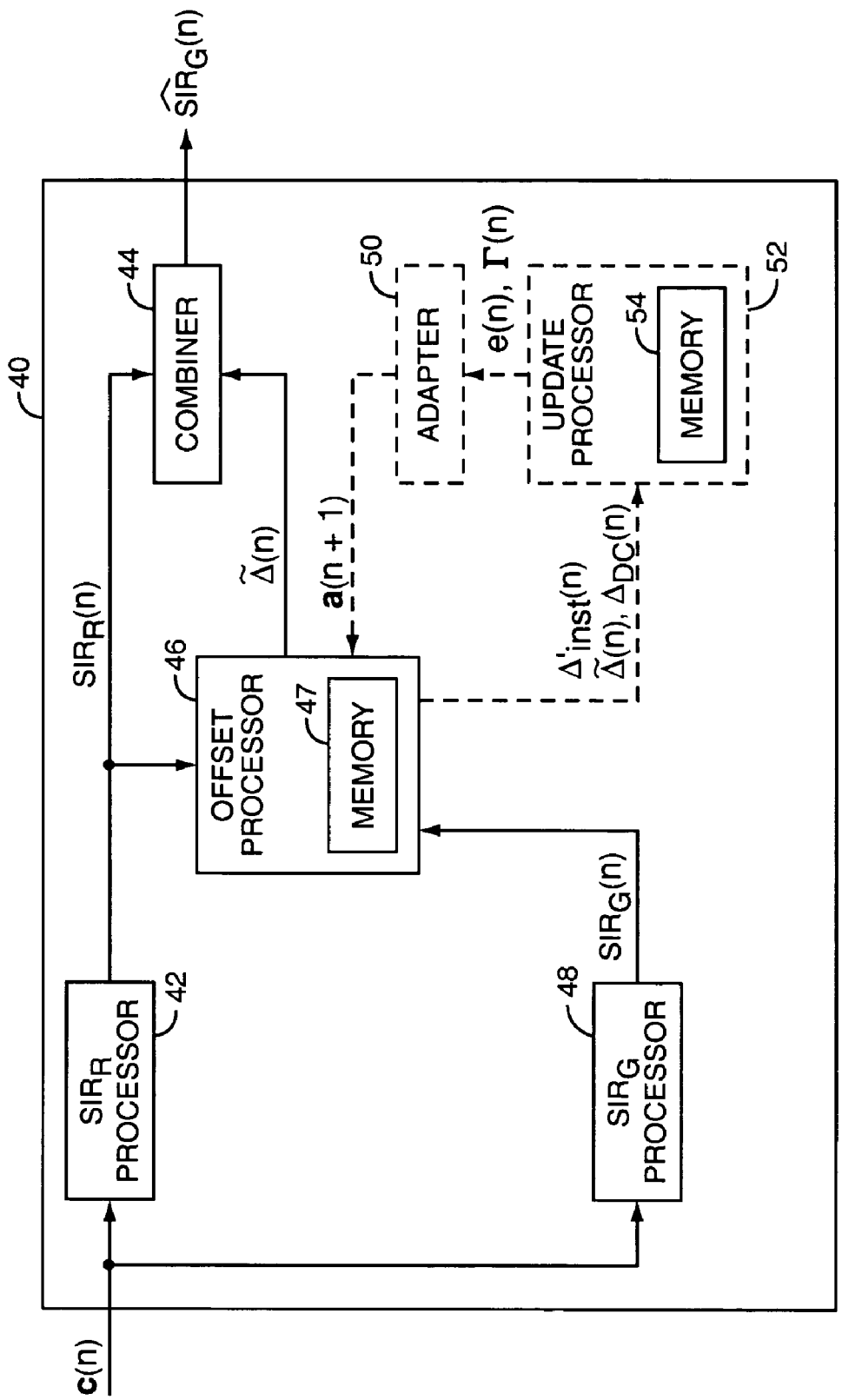
FIG. 5 illustrates a block diagram for one exemplary SIR estimator according to the present invention.

FIG. 5 illustrates one exemplary SIR estimator 40 according to the present invention for implementing the above-described process. In the illustrated embodiment, SIR estimator 40 includes a RAKE SIR processor 42, a combiner 44, an offset processor 46, and a G-RAKE processor 48. While the exemplary embodiment of FIG. 5 explicitly illustrates RAKE and G-RAKE SIR processors 42, 48, the present invention applies to any SIR estimator 40 that uses a first SIR processor and a second SIR processor to generate first and second SIR estimates, respectively, based on different receiver types, as discussed above. Further, those skilled in the art will appreciate that while FIG. 5 illustrates different RAKE, G-RAKE, and offset processors, these processors may be combined into one or more processors.

RAKE SIR processor 42 computes a RAKE SIR for the current time interval $SIR_R(n)$ for a RAKE receiver according to any known means, such as those illustrated in Equation (5). Combiner 44 combines $SIR_R(n)$ with the SIR offset computed for the current time interval during a previous time interval to generate the G-RAKE SIR estimate for the current time interval $\hat{SIR}_G(n)$ according to Equation (7). In one exemplary embodiment, offset processor 46 includes memory 47 that stores the SIR offset(s) computed during a given time interval for use during later time interval(s). While FIG. 5 illustrates specific memory 47 in offset processor 46, those skilled in the art will appreciate that any memory associated with SIR estimator 40 may be used to store one or more offsets.

G-RAKE SIR processor 48 computes a final G-RAKE SIR for the G-RAKE receiver during the current time interval $SIR_G(n)$ according to any conventional methods, such as the method illustrated by Equation (5). Offset processor 46 receives $SIR_R$ and $SIR_G$ generated by RAKE SIR processor 42 and the G-RAKE SIR processor 48, respectively, and generates the SIR offset for the subsequent time interval $\tilde{\Delta}(n+1)$ according to Equations (8) and (9). Memory 47 stores the resulting SIR offset $\tilde{\Delta}(n+1)$ until combiner 44 retrieves it during a subsequent time interval to generate a subsequent G-RAKE SIR estimate $\hat{SIR}_G$.

SIR estimator 40 may optionally include adaptor 50 and update processor 52, as shown in the dashed boxes of FIG. 5, to implement the embodiment corresponding to Equations (10) through (15). In this exemplary SIR estimator 40, update processor 52 receives the DC compensated SIR error $\Delta_e'$, the estimated DC components $\Delta_{DC}$, and the offset $\tilde{\Delta}$ generated for the current time interval according to Equations (10) and (11). Based on these values, update processor 52 generates the filter adaptation information $e(n)$ and $\Gamma(n)$ according to Equations (14) and (15) for the current time interval. After storing $\Gamma(n)$ for future use in memory, such as memory 54, update processor 52 provides $e(n)$ and $\Gamma(n)$ to adaptor 50. Adaptor 50 modifies the linear prediction filter according to Equation (15) to generate the filter coefficients for the subsequent time interval $a(n+1)$. The updated filter $a(n+1)$ is provided to offset processor 46, where it is stored in memory 47 for future use during a subsequent time interval. Alternatively, $a(n+1)$ may be stored in any memory associated with SIR estimator 40.

The above describes predicting a G-RAKE SIR estimate during a current time interval $\hat{SIR}_G(n)$ by modifying a RAKE SIR generated during the current time interval $SIR_R(n)$ using an offset $\tilde{\Delta}(n)$ generated during a previous time interval. However, according to another exemplary embodiment, the present invention may also predict the G-RAKE SIR estimate $\hat{SIR}_G$ directly using an adaptive linear prediction filter similar to the one described above. This exemplary embodiment implements the same DC removal, prediction, and filter adaptation concepts that were described above, with some slight modifications. In this embodiment, as shown in Equation (16), the DC compensation does not include the RAKE SIR. Instead, the DC component of the $SIR_G$ is estimated, so that a DC compensated G-RAKE SIR, $SIR_{DC}$, may be directly computed.

$$SIR_{DC}(n)=\alpha SIR_{DC}(n-1)+(1+\alpha)SIR_G(n)$$

$$SIR_{inst}(n)=SIR_G(n)-SIR_{DC}(n) \tag{16}$$

Based on the DC compensated G-RAKE SIR, SIR estimator 40 may generate the G-RAKE SIR estimate according to:

$$\hat{SIR}_G(n+1)=a^T(n)\Gamma(n)+SIR_{DC}(n), \tag{17}$$

where Equation (13) defines the linear prediction filter a, and Equation (18) defines $\Gamma(n)$.

$$\Gamma(n)=[SIR_{inst}(n), SIR_{inst}(n-1), SIR_{inst}(n-2)]^T \tag{18}$$

As with the above-described exemplary embodiment, the linear prediction filter for the first time interval may be initialized to zero, e.g., $a(0)=[0, 0, 0]^T$. Further, for this embodiment, SIR estimator 40 may adapt the linear prediction filter according to:

$$e(n) = SIR_{inst}(n) + SIR_{DC}(n) - SIR_G(n) \tag{19}$$

$$a(n+1) = a(n) + \frac{\mu}{|\Gamma(n)|^2 + \delta} e(n)\Gamma(n),$$

where $\mu$ and $\delta$ are as defined above.

Figure 6:
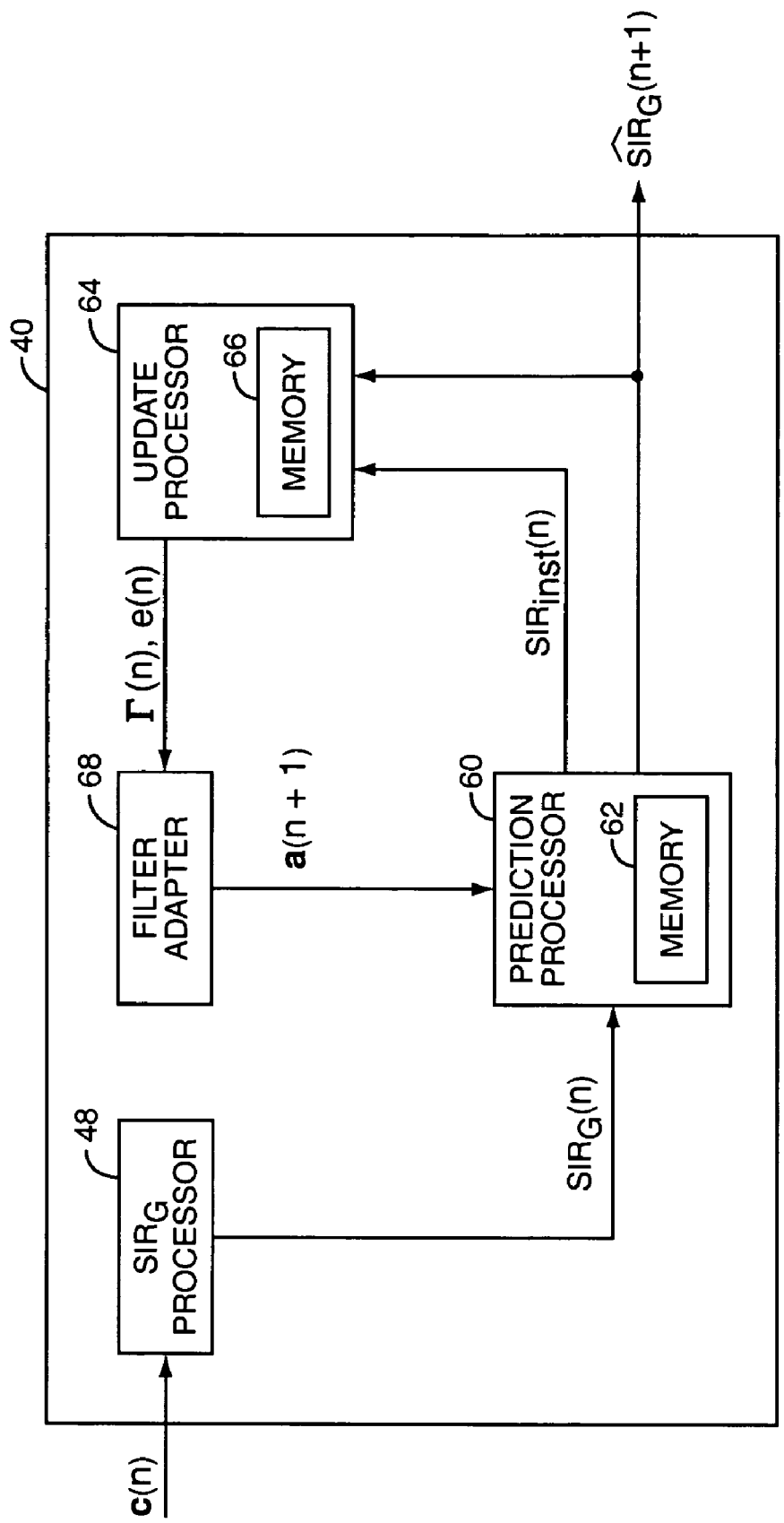
FIG. 6 illustrates another block diagram for one exemplary SIR estimator according to the present invention.

FIG. 6 illustrates one exemplary SIR estimator 40 for implementing the exemplary embodiment corresponding to Equations (16) through (19). According to this embodiment, SIR estimator 40 includes G-RAKE SIR processor 48, a prediction processor 60, an update processor 64, and a filter adaptor 68. Using $SIR_G(n)$ provided by G-RAKE SIR processor 48, $\Gamma(n)$ provided by update processor 64, and the filter a(n) stored in memory 62 (or other memory associated with SIR estimator 40), prediction processor 60 may generate the SIR estimate for a subsequent time interval $\hat{SIR}_G(n+1)$ according to Equation (17). In addition, prediction processor 40 may generate the DC compensated value of $SIR_G(n)$, $SIR_{inst}(n)$, according to Equation (16). Based on $\hat{SIR}_G(n)$ and $SIR_{inst}(n)$, update processor 64 updates e(n) and $\Gamma(n)$ according to Equations (18) and (19), and stores $\Gamma(n)$ in memory 66 for future use. Filter adaptor 68 modifies the prediction filter based on e(n) and $\Gamma(n)$ according to Equation (19) to generate the prediction filter coefficients for a subsequent time interval a(n+1), and provides the updated filter to prediction processor 60, where it is stored in memory 62 for future use during a subsequent time interval.

The above describes various methods for generating an SIR estimate for a current time interval based on SIR calculations performed in one or more previous time intervals. Because the G-RAKE SIR estimates generated according to the present invention include the interference suppression typically associated with a G-RAKE receiver, the G-RAKE SIR estimates are more accurate than SIR estimates generated according to conventional methods. Further, because the G-RAKE SIR estimates generated according to the present invention may be computed once the channel estimates are made available and without waiting for interference suppressing components, such as G-RAKE combining weights, the G-RAKE SIR estimates provide an accurate SIR that may be used to provide channel feedback in a timely manner. As such, control processor 36 may include, for example, power control processor 36a and CQI processor 36b (FIG. 2) to provide accurate power control commands and CQI estimates to the network via transmitter 38 in a timely manner.

While the above examples and explanations describe the invention in terms of RAKE and G-RAKE receivers, those skilled in the art will appreciate that the present invention applies to any receiver system capable of quickly determining an estimate of a signal quality metric for a simple receiver type while using an estimate of the signal quality metric for a more complicated and advanced receiver type to process the received data. Therefore, as discussed above, the present invention is not limited to the despread and combine type receiver discussed above.

Further, the above describes the invention in terms of a downlink channel. However, those skilled in the art will appreciate that the present invention also applies to uplink channels.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of determining a signal quality metric for an interference suppression receiver comprising:
   determining a first estimate of the signal quality metric based on one or more signals received by the interference suppression receiver, wherein the first estimate does not reflect interference suppression performed by the interference suppression receiver;
   generating an offset based on the interference suppression performed by the interference suppression receiver; and
   applying the offset to the first estimate to determine a second estimate of the signal quality metric for the interference suppression receiver, wherein the second estimate reflects the interference suppression performed by the interference suppression receiver.

2. The method of claim 1 wherein the first estimate is determined during a current time interval, and wherein the offset comprises an offset determined during a previous time interval.

3. The method of claim 2 further comprising:
   determining a final estimate of the signal quality metric for the interference suppression receiver during the current time interval based on one or more of the signals received by the interference suppression receiver, wherein the final estimate reflects the interference suppression performed by the interference suppression receiver; and
   generating an offset for a subsequent time interval based on the final estimate.

4. The method of claim 3 wherein generating the offset for the subsequent time interval comprises generating the offset based on a filter and an error value associated with the current time interval, said error value comprising a difference between the first and final estimates determined during the current time interval.

5. The method of claim 4 further comprising adapting the filter during the current time interval based on the error value for the current time interval to generate filter coefficients for the filter for a subsequent time interval.

6. The method of claim 5 wherein adapting the filter comprises modifying filter coefficients associated with the current time interval based on the offset for the current time interval.

7. The method of claim 5 wherein the filter comprises one of a smoothing filter and a linear prediction filter.

8. The method of claim 3 further comprising:
   generating channel feedback based on the second estimate; and
   processing a received signal using the final estimate.

9. The method of claim 8 wherein generating channel feedback comprises generating a power control command for a downlink channel or an uplink channel based on the second estimate.

10. The method of claim 8 wherein generating channel feedback comprises generating a channel quality indication based on the second estimate.

11. The method of claim 1 wherein the first estimate comprises an estimate of a RAKE receiver signal quality metric and the second estimate comprises an estimate of a G-RAKE receiver signal quality metric.

12. The method of claim 1 wherein the signal quality metric comprises a signal-to-interference ratio.

13. A signal quality metric estimator for an interference suppression receiver comprising:
   a first signal quality metric processor configured to determine a first estimate of a signal quality metric based on one or more signals received by the interference suppression receiver, wherein the first estimate does not reflect interference suppression performed by the interference suppression receiver;
   an offset processor configured to generate an offset based on the interference suppression performed by the interference suppression receiver; and a combiner to apply the offset to the first estimate to generate a second estimate of the signal quality metric for the interference suppression receiver, wherein the second estimate reflects the interference suppression performed by the interference suppression receiver.

14. The signal quality metric estimator of claim 13 wherein the first estimate is determined during a current time interval, and wherein the offset comprises an offset determined during a previous time interval.

15. The signal quality metric estimator of claim 14 further comprising:
a second signal quality metric processor configured to compute a final estimate of the signal quality metric during the current time interval based on one or more of the signals received by the interference suppression receiver, wherein the final estimate reflects the interference suppression performed by the interference suppression receiver; and
wherein the offset processor generates the offset by generating an offset for a subsequent time interval based on the final estimate.

16. The signal quality metric estimator of claim 15 wherein the offset processor generates the offset for the subsequent interval based on a filter and an error value associated with the current time interval, said error value comprising a difference between the first and final estimates determined during the current time interval.

17. The signal quality metric estimator of claim 16 further comprising a filter adaptor configured to adapt the filter during the current time interval based on the error value for the current time interval to generate filter coefficients for the filter for a subsequent time interval.

18. The signal quality metric estimator of claim 16 wherein the filter comprises one of a smoothing filter and a linear prediction filter.

19. The signal quality metric estimator of claim 15 wherein the first estimate comprises an estimate of a RAKE receiver signal quality metric, and wherein the second estimate comprises an estimate of a G-RAKE receiver signal quality metric.

20. The signal quality metric estimator of claim 13 wherein the signal quality metric comprises a signal-to-interference ratio.

21. An interference suppression receiver circuit in a wireless system comprising:
a signal quality metric estimator to generate a signal quality metric estimate, said signal quality metric estimator comprising:
a first signal quality metric processor configured to compute a first estimate of the signal quality metric based on one or more signals received by the interference suppression receiver circuit, wherein the first estimate does not reflect interference suppression performed by the interference suppression receiver circuit;
an offset processor configured to generate an offset based on the interference suppression performed by the interference suppression receiver; and
a combiner to apply the offset to the first estimate to generate a second estimate of the signal quality metric for the interference suppression receiver circuit, wherein the second estimate reflects the interference suppression performed by the interference suppression receiver circuit.

22. The receiver circuit of claim 21 wherein the first signal quality metric processor computes the first estimate during a current time interval, and wherein the offset comprises an offset determined during a previous time interval.

23. The receiver circuit of claim 21 wherein the signal quality metric estimator further comprises:
a second signal quality metric processor configured to compute a final estimate of the signal quality metric during the current time interval based on one or more wireless signals received during the current time interval, wherein the final estimate of the signal quality metric reflects the interference suppression performed by the interference suppression receiver circuit; and
wherein the offset processor generates the offset by generating an offset for a subsequent time interval based on the final estimate.

24. The receiver circuit of claim 21 further comprising:
a control processor configured to generate channel feedback based on the second estimate; and
a baseband processor configured to process a received signal using the final estimate.

25. The receiver circuit of claim 24 wherein the control processor comprises a power control processor configured to determine a power control command for a downlink channel or an uplink channel based on the second estimate.

26. The receiver circuit of claim 21 wherein the control processor comprises a quality processor configured to estimate a channel quality indication associated with received signals based on the second estimate.

* * * * *

UNITED STATES PATENT AND TRADEMARK OFFICE
CERTIFICATE OF CORRECTION

PATENT NO.       : 7,711,033 B2
APPLICATION NO.  : 11/105797
DATED            : May 4, 2010
INVENTOR(S)      : Reial et al.

It is certified that error appears in the above-identified patent and that said Letters Patent is hereby corrected as shown below:

In Column 5, Lines 12-15, in Equation (6), delete " $SIR \approx \sum_j \frac{|c_j|^2}{I_j},$ " and insert -- $SIR = \sum_i \frac{|c_i|^2}{I_i},$ --, therefor.

In Column 6, Line 4, delete "$SIR_G(N)$" and insert -- $SIR_G(n)$ --, therefor.

In Column 5, Line 60, delete " $\hat{SIR}_G(n),$ " and insert -- $\widehat{SIR}_G(n),$ --, therefor.

In Column 5, Line 63, in Equation (7), delete " $\hat{SIR}_G(n)$ " and insert -- $\widehat{SIR}_G(n)$ --, therefor.

In Column 7, Line 57, delete " $\hat{SIR}_G(n)$ " and insert -- $\widehat{SIR}_G(n)$ --, therefor.

In Column 8, Line 7, delete " $\hat{SIR}_G.$ " and insert -- $\widehat{SIR}_G.$ --, therefor.

In Column 8, Line 27, delete " $\hat{SIR}_G(n)$ " and insert -- $\widehat{SIR}_G(n)$ --, therefor.

In Column 8, Line 33, delete " $\hat{SIR}_G$ " and insert -- $\widehat{SIR}_G$ --, therefor.

In Column 8, Line 48, in Equation (17), delete " $\hat{SIR}_G(n+1)$ " and insert -- $\widehat{SIR}_G(n+1)$ --, therefor.

In Column 8, Line 62, in Equation (19), delete " $SIR_G(n)$ " and insert -- $\widehat{SIR}_G(n)$ --, therefor.

In Column 9, Line 10, delete " $\hat{SIR}_G(n+1)$ " and insert -- $\widehat{SIR}_G(n+1)$ --, therefor.

In Column 9, Line 13, delete " $\hat{SIR}_G(n)$ " and insert -- $\widehat{SIR}_G(n)$ --, therefor.

Signed and Sealed this

Tenth Day of August, 2010

David J. Kappos
*Director of the United States Patent and Trademark Office*